US009428282B2

(12) United States Patent
Lane et al.

(10) Patent No.: US 9,428,282 B2
(45) Date of Patent: Aug. 30, 2016

(54) OBSTRUCTION LIGHT HAVING WIRELESS STATUS TRANSMISSION CAPABILITY

(71) Applicant: SPX Corporation, Charlotte, NC (US)

(72) Inventors: Mark Lane, Franklin, TN (US);
Russell Bruner, Franklin, TN (US);
Scott Fulton, Franklin, TN (US); David Duryea, Franklin, TN (US);
Christopher Range, Franklin, TN (US)

(73) Assignee: SPX Corporation, Charlotte, NC (US)

( * ) Notice: Subject to any disclaimer, the term of this patent is extended or adjusted under 35 U.S.C. 154(b) by 137 days.

(21) Appl. No.: 14/196,686

(22) Filed: Mar. 4, 2014

(65) Prior Publication Data

US 2014/0247164 A1 Sep. 4, 2014

Related U.S. Application Data

(60) Provisional application No. 61/771,209, filed on Mar. 1, 2013.

(51) Int. Cl.
*B64F 1/20* (2006.01)

(52) U.S. Cl.
CPC ..................................... *B64F 1/20* (2013.01)

(58) Field of Classification Search
CPC ........................................................ B64F 1/20
USPC ....... 340/983, 985, 642; 362/431; 416/132 B
See application file for complete search history.

(56) References Cited

U.S. PATENT DOCUMENTS

| 7,196,633 B2* | 3/2007 | Ardelan et al. ............... 340/641 |
| 2004/0254725 A1* | 12/2004 | Douville ....................... 701/213 |
| 2010/0204960 A1* | 8/2010 | Hagadone ........... G06F 11/3006 702/188 |
| 2012/0112647 A1* | 5/2012 | Dinc ............................. 315/186 |
| 2013/0070466 A1* | 3/2013 | O'Brien ............. F21V 23/0435 362/382 |
| 2013/0234862 A1* | 9/2013 | Toth et al. ................ 340/870.03 |
| 2013/0257284 A1* | 10/2013 | VanWagoner et al. ....... 315/131 |
| 2014/0125250 A1* | 5/2014 | Wilbur ........................... 315/297 |

* cited by examiner

*Primary Examiner* — Brent Swarthout
(74) *Attorney, Agent, or Firm* — Baker & Hostetler LLP

(57) ABSTRACT

An obstruction light system includes a light and lens configured to output light. The system further includes a plurality of sensors associated with the light, a processor configured to receive outputs from the plurality of sensors and determine a status of the light based on the output from the plurality of sensors, and a wireless transmitter configured to transmit the status from the processor.

18 Claims, 3 Drawing Sheets

OBSTRUCTION LIGHT HAVING WIRELESS STATUS TRANSMISSION CAPABILITY

CROSS REFERENCE TO PRIOR APPLICATIONS

This application claims the benefit from U.S. Provisional Application No. 61/771,209 filed on Mar. 1, 2013 which is hereby incorporated by reference in its entirety.

BACKGROUND OF THE DISCLOSURE

1. Field of the Disclosure

This disclosure is directed to an obstruction light configured to allow technicians to inspect various aspects of the obstruction light and associated equipment wirelessly. More specifically, the disclosure is directed to an obstruction light configured to allow technicians to inspect various aspects of the obstruction light and associated equipment wirelessly utilizing a wireless fidelity (Wi-Fi) hotspot.

2. Background

Obstruction lights are lights mounted to taller buildings, towers, antennas, or the like (hereinafter generally referred to as facilities or a facility), to provide a lighted indication to aircraft pilots of the location of the facility. Safe operation of aircraft necessitates that these obstruction lights are properly operating. Accordingly, the owners and operators of facilities desire to ensure that the obstruction lights are operating by conducting periodic inspections. Moreover, in some municipalities, states, and/or countries there may be laws requiring that the operators of such facilities ensure that the obstruction lights are operating by periodically inspecting the obstruction lights. For example, there may be a law in the United States that requires inspecting the obstruction lights every 6 months. However, obstruction lights are typically mounted to the highest point of a facility. This creates the necessity for a technician to climb to the top of the facility and further gain access to the obstruction light in order to conduct the inspection. Such activities can be time-consuming, inefficient, dangerous, and so on for the technician.

Accordingly, there is a need for a way in which a technician can quickly and efficiently conduct an inspection of an obstruction light.

SUMMARY OF THE DISCLOSURE

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

In one aspect of the disclosure, an obstruction light system comprising a light and lens configured to output light; a plurality of sensors associated with the light; a processor configured to receive outputs from the plurality of sensors and determine a status of the light based on the output from the plurality of sensors, wherein the sensors are an ambient light sensor, a voltage sensor, a current sensor, or a temperature sensor; and a wireless transmitter configured to transmit the status is disclosed.

In another aspect of the disclosure, a method of operating an obstruction light system comprising arranging a light and lens configured to output light on a facility; providing a plurality of sensors associated with the light, wherein the sensors are an ambient light sensor, a voltage sensor, a current sensor, or a temperature sensor; providing a processor configured to receive outputs from the plurality of sensors and determine a status of the light based on the output from the plurality of sensors; and providing a wireless transmitter configured to transmit the status is disclosed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
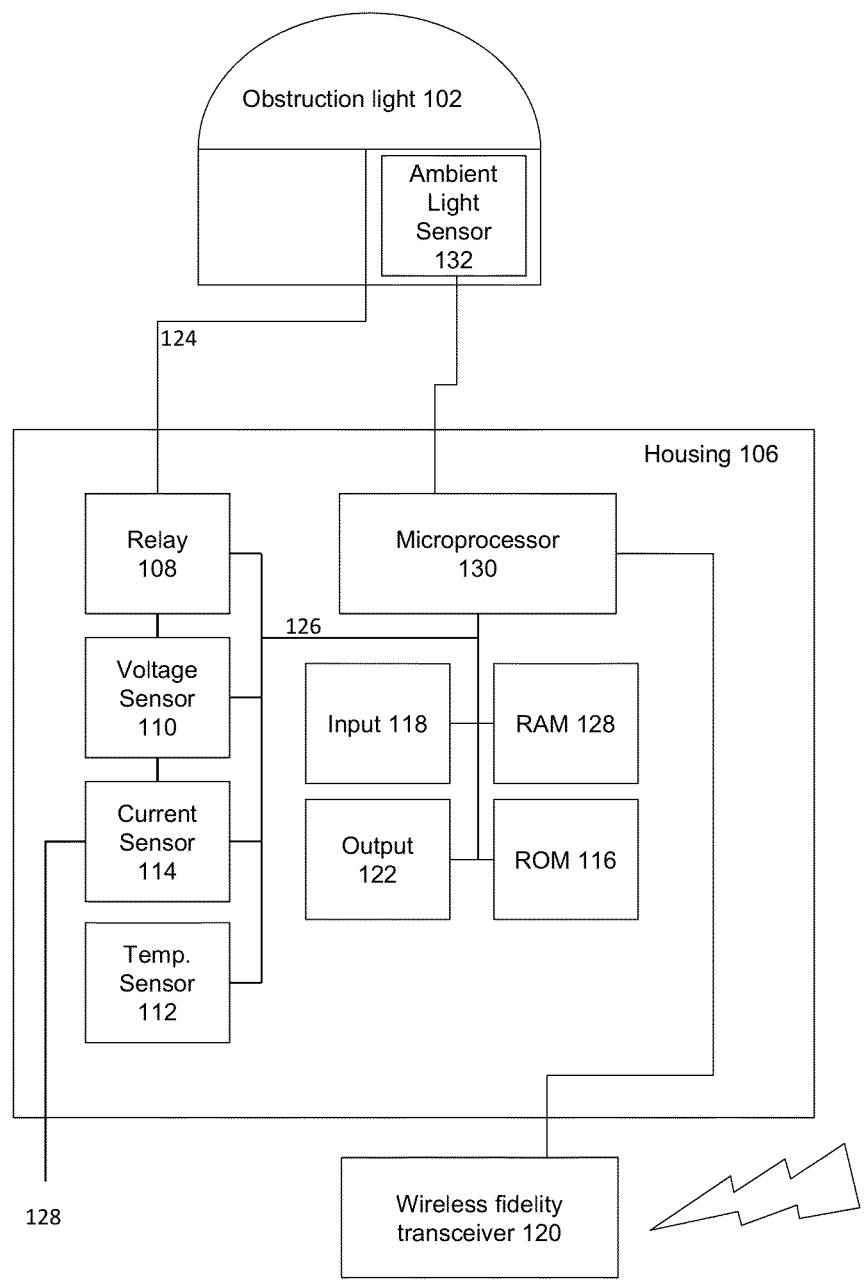
FIG. 1 shows an obstruction light having a wireless transmitter according to one aspect of to the invention.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 shows an obstruction light 102 having a wireless transmitter 120 according to the invention. In particular, FIG. 1 shows an obstruction light 102 that may be installed in a facility. In operation, such obstruction lights 102 would be mounted to the highest point of a facility to provide a lighted indication of the facility's position to a pilot of an aircraft. If there is more than one obstruction light 102, then one of the lights may be a master light while the others may be slave lights. Additional obstruction lights 102 may be mounted at various intermediate vertical locations along the facility. Such additional obstruction lights 102 are often referred to as markers.

The obstruction light 102 may be one or more incandescent lights, light emitting diodes (LED), a high-intensity discharge (HID) lamps, a fluorescent bulbs, or other types of lights and lamps. For example, the obstruction light 102 may be the light described in U.S. patent application Ser. No. 13/939,687 incorporated by reference in its entirety herein.

FIG. 1 further shows various electrical connections to the obstruction light 102 and FIG. 1 further shows a housing 106 having a microprocessor 130 for controlling the operation of the obstruction light 102. The housing 106 is optional. All the components of the housing 106 may be arranged within each obstruction light 102. Alternatively, all the components of the housing 106 may be arranged within a particular one of the obstruction lights 102 (master light). This master obstruction light 102 may then communicate to other obstruction lights 102 (slave lights) within the facility including marker lights. All the components of the housing 106 may be arranged within the wireless transceiver 120. Other arrangements of the components of the housing 106 are contemplated as well.

The obstruction light 102 or the housing 106 may further include an ambient light sensor 132 to determine when to turn on the obstruction light 102, turn off the obstruction light 102, and/or determine when to change the color output from the obstruction light 102.

The housing 106 may include a relay 108 to provide switching actions to connect or disconnect power to the obstruction light 102. The relay 108 may be connected to the obstruction light 102 via connection 124. The housing 106 may further include various current sensors 114, temperature sensors 112, and voltage sensors 110 for sensing various physical properties of the associated circuitry related to operating the obstruction light 102. Additionally or alternatively various current sensors 114, temperature sensors 112, and voltage sensors 110 for sensing various physical properties of the associated circuitry related to operating the obstruction light 102 may be arranged in the obstruction light 102. In a particular example, the temperature sensor 112 may be arranged in the controller of the obstruction light 102 and a temperature sensor 112 may be arranged in the beacon of the obstruction light 102. A current sensor 114 may be arranged in each string of LEDs (red and white) of the obstruction light 102 when the obstruction light is implemented as an LED-based obstruction light. A current sensor 114 may be arranged in each string of LEDs (red and white) of a marker obstruction light 102 when the marker obstruction light is implemented as an LED-based obstruction light. A voltage sensor 110 may be arranged in each string of LEDs (red and white) of marker obstruction light 102 when the marker obstruction light is implemented as an LED-based obstruction light.

Examples of relays 108 include, but are not limited to, latching relays, reed relays, mercury relays, and solid state relays. Examples of current sensors 114 include, but are not limited to, a Hall effect integrated circuit sensor, a fiber optic current sensor, a Rogowski coil, and the like. Examples of temperature sensors 112 include, but are not limited to, thermometers, thermocouples, resistive temperature devices, thermistors, bimetallic devices, and the like. Examples of voltage sensors 110 include, but are not limited to, analog voltmeters, digital voltmeters, and the like. Additionally, each of the sensors may include an analog to digital conversion device, filter, and the like circuitry to condition the various signals for input to the microprocessor 130.

The housing 106 may further include a microprocessor 130 that receives inputs from the ambient light sensor 132, provides control to the relay 108, receives sensor outputs from the current sensors 114, temperature sensors 112, and voltage sensors 110, and so on. The microprocessor 130 may be, for example, an application specific integrated circuit, a field programmable gate array, or a programmable logic array. The microprocessor 130 may also communicate with a read-only memory 116, a random access memory 128, a power supply 134, an input device 118, an output device 122, and the like. The microprocessor 130 may communicate with the relay 108, current sensors 114, temperature sensors 112, voltage sensors 110, read-only memory 116, random access memory 128, input device 118, and output device 122 over a bus 126. The input device 118 may be, for example, a keyboard, a mouse, a touch sensitive display, one or more buttons, switches, jumpers, touch sensitive screens, and the like. The output device 122 may be, for example, a display device, a sound output device, a wireless output circuit, or the like. Additionally, each of the components noted above may also be arranged outside the housing 106.

The microprocessor 130 may further include a universal asynchronous receive transmit circuit, RS-232 serial communication circuit, and the like to provide input and output capabilities to the microprocessor. These input and output capabilities may be associated with a communication channel as defined herein. Additionally, the input and output capabilities may include wireless communication capabilities. In this regard, the microprocessor may be connected to or include a transceiver that may communicate through the above input and output circuitry and/or other circuitry. In a particular aspect, the transceiver may include a wireless fidelity transceiver 120. However, other types of transceivers, such as Bluetooth and ZigBee, operating in conjunction with other types of communication channels are contemplated as well and are described herein. In a further particular aspect, the microprocessor 130 and transceiver 120 may create a wireless fidelity hot spot consistent with the IEEE 802.11 protocol.

The microprocessor 130 may include one or more algorithms that interrogate the various circuitry and sensors associated with the obstruction light 102. This interrogation process may be implemented continuously or discretely. If the process is implemented discretely, the interrogation process may be performed periodically every 1 to 60 min., 1 to 24 hours, or 1 to 7 days. It is further contemplated that any time period may be chosen as desired for the interrogation process of the obstruction light 102, microprocessor 130, and associated components. The interrogation process may include determining temperatures from the temperature sensors 112, determining currents from the current sensors 114, determining voltage with the voltage sensors 110, or the like. Once these various values are determined through the interrogation process, they may be stored in the random access memory 128, the read-only memory 116, or both. Thereafter, a technician may wirelessly access the random access memory 128, read-only memory 116, or both to attain the various values in order to ensure that the obstruction light 102 is operating properly. In this regard, a technician may obtain these values and be able to ensure that the obstruction light 102 is operating properly.

In a particular implementation of the invention, the stored values determined through the interrogation process may be transmitted by the transceiver 120 so that the technician can obtain these values to ensure proper operation of the obstruction light 102 as described above. Because these values are transmitted by the transceiver 120, the technician does not have to climb to the location of the obstruction light 102 and further gain access to the obstruction light 102 at the facility to perform the inspection.

In a further particular implementation of the invention, the transceiver 120 may implement a wireless fidelity communication channel. This wireless fidelity communication channel may implement a wireless fidelity hotspot. In one particular implementation, the transceiver may be a transceiver manufactured by TP-LINK USA CORPORATION, of City of Industry, Calif. 91744, USA.

According to the invention, the technician need only be within range of the wireless fidelity hotspot in order to communicate with the transceiver of the obstruction light 102, and hence the microprocessor 130 and the stored information, in order to perform the inspection of the obstruction light 102. In this regard, the technician may be able to perform the inspection a short distance from the facility, from their vehicle located outside of the facility, or the like. Hence the inspector does not need to climb to the top of facility and further gain access to the obstruction light in order to perform the inspection.

The technician may be able to perform the process by connecting to the wireless fidelity hotspot with a wireless ready device such as a smart phone, tablet computer, laptop computer, or the like. Each of these devices may have a particular application for connecting to the wireless fidelity hotspot or may simply be able to utilize a web browser to obtain the inspection information. If the wireless fidelity hot spot and information are set up to be accessed by a web browser (web-based as defined herein), the stored information may be located at a particular universal resource location (URL) address. The stored information may also be sent from the wireless fidelity hotspot to a wireless ready device using, for example, electronic mail, text message, Short Message Service, Multimedia Messaging Service, or the like.

Additionally, the transceiver 120 and a wireless fidelity hot spot generated by the transceiver 120 may include certain security features to prevent unauthorized users from obtaining access to the hotspot. The security features may include a password and user ID, MAC ID filtering, and an encryption key, such as Wired Equivalent Privacy and Wi-Fi Protected Access, or the like.

Figure 2:
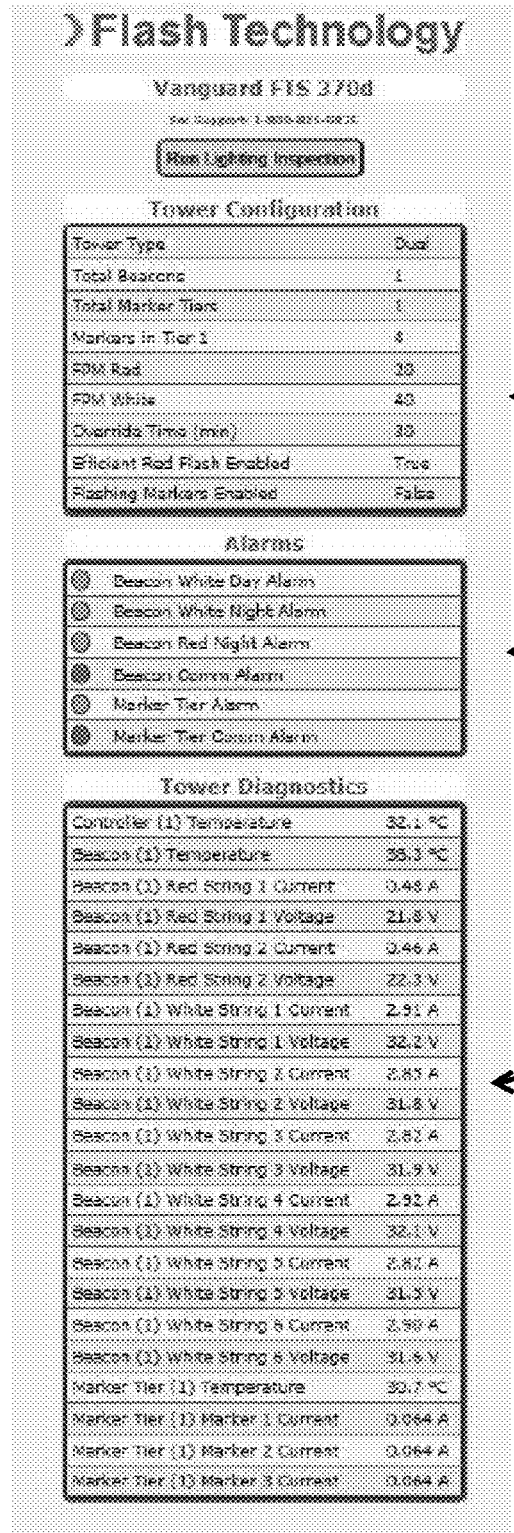
FIG. 2 shows exemplary details of the output information from the wireless transmitter of FIG. 1 during an inspection according to one aspect of to the invention.

FIG. 2 shows exemplary details of the output information from the wireless transmitter 120 of FIG. 1 according to the invention. In particular, FIG. 2 shows a web browser output of the information stored by the microprocessor 130 of the obstruction light 102. The information may include the tower configuration as shown by the upper box 202, various alarms as shown by the center box 204, and various diagnostics as shown by the bottom box 206. Of course, the use of other types of information, less information, or greater detailed information is contemplated as well.

The tower configuration as shown by the upper box 202 may include the tower type, the total number of beacons, the total marker tiers, the number of markers in each tier, the number of flashes per minute for red, the number of flashes per minute for white, the override time, whether efficient red flash is enabled, whether flashing markers are enabled, and the like. Of course, the use of other types of information, less information, or greater detailed information is contemplated as well.

The various alarms as shown by the center box 204 may include beacon white day alarms, beacon white night alarms, beacon red night alarms, beacon communication alarms, marker tier alarms, marker tier communication alarms, and the like. Of course, the use of other types of information, less information, or greater detailed information is contemplated as well.

The various diagnostics as shown by the bottom box 206 may include controller temperature, beacon temperature, LED string currents for each string of LEDs, LED string voltages for each string of LEDs, marker tier temperature for each marker, marker tier current for each marker, and the like. Of course, the use of other types of information, less information, or greater detailed information is contemplated as well.

Figure 3:
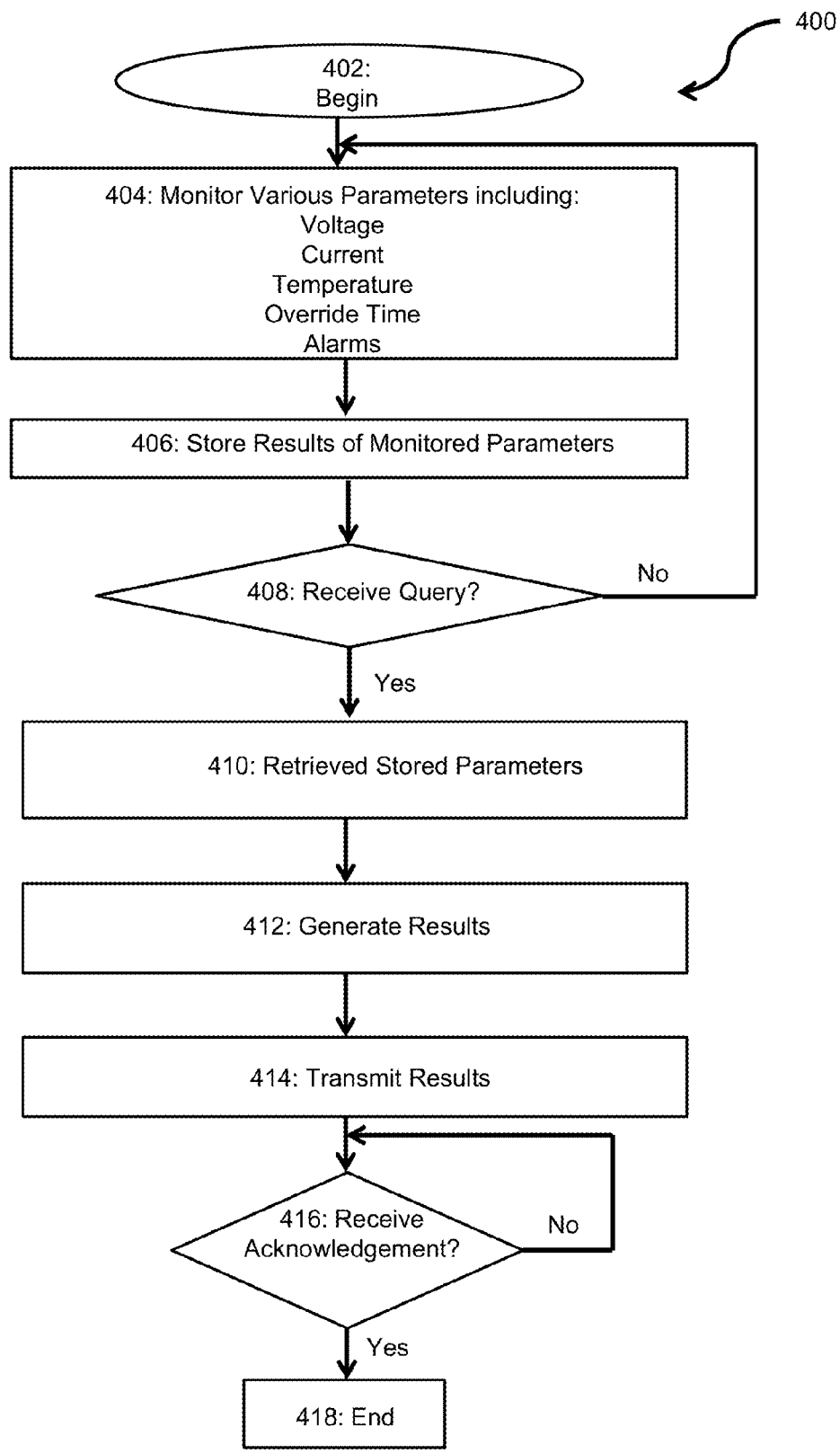
FIG. 3 is a flow chart illustrating a method of using the system according to one aspect of to the invention.

FIG. 3 is a flow chart illustrating a method 400 of using the system of the present disclosure. This exemplary method 400 may be provided by way of example, as there are a variety of ways to carry out the method. Each block shown in FIG. 3 represents one or more processes, methods or subroutines carried out in exemplary method 400. Additionally, other processes may be implemented and are contemplated by the invention.

Referring to FIG. 3, exemplary method 400 may begin at step 402. At 402, the method 400 for monitoring and transmitting the conditions of the obstruction light 102 to a technician may be started. At 404, the microprocessor 130 may interrogate the various sensors 110, 112, 114, input device 118, and the like to gather data about the operating conditions of the obstruction light 102. Such operating conditions may include, for example, the temperature, voltage, current, override time, and alarms for multiple components in an obstruction light system. Once all of the information regarding the operating conditions of the obstruction light 102 has been gathered, the method 400 may proceed to 406.

At 406, the microprocessor 130 may store the information about the operating conditions in the read-only memory 116, random access memory 128, or both. After the information about the operating condition has been stored, the method 400 may proceed to 408.

At 408, the microprocessor 130 may determine whether a query request has been received by the wireless fidelity transceiver 120 from a technician to gather information about the operating conditions of the obstruction light 102. If such a query request has not been received, the method returns to 404. If such a query request has been received, the method may proceed to 410.

At 410, the microprocessor 130 retrieves information about the operating conditions of the obstruction light 102 from the read-only memory 116, random access memory 128, or both. After the information about the operating conditions has been retrieved, the method 400 may proceed to 412.

At step 412, the microprocessor 130 may generate results useful to the technician in assessing whether the obstruction light 102 is operating as it was designed. The generated results were diagnostics may be based on the retrieved information in 406. Such results may be generated in a format that is easily understandable to the technician. The method 400 may then proceed to 414.

At 414, the microprocessor 130 may transmit the generated results to the technician over the communication channel using the wireless fidelity transceiver 120 or other type of wireless device using a communication channel. After the generated results have been transmitted, the method 400 may proceed to 416.

At 416, the system may wait for an acknowledgement from the technician that the transmitted generated results have been received. Such an acknowledgement can serve as a time stamp for when the last inspection occurred. If an acknowledgment has not yet arrived, then the method 400 remains at 412. If an acknowledgment has arrived, then the method 400 may proceed to 418. If an acknowledgment is not received within a predetermined time, the process 416 may timeout and advance to 418.

At 418, the method 400 for monitoring and transmitting the conditions of the obstruction light 102 to a technician may end.

Accordingly, the invention as described above allows an operator to utilize a wireless device to gain access to stored information in a memory 128, 116 of an obstruction light 102. Gaining access to the stored information allows the technician to inspect the obstruction light 102 and ensure its proper operation without having to climb to the top of the facility, and further gain access to the obstruction light 102. This allows the technician to reduce the amount of time spent inspecting, makes the technician more efficient, and the like.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the invention may be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

In an aspect, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An obstruction light system and obstruction lighting monitoring system comprising:
   a light and lens configured to output light;
   a plurality of sensors associated with components of the obstruction light system, wherein the plurality of sensors comprise the following: an ambient light sensor, a voltage sensor, a current sensor, and a temperature sensor;
   a processor configured to receive an output from the plurality of sensors;
   a storage device configured to store the output from the plurality of sensors in the storage device;
   the processor further configured to generate diagnostics of the components of the obstruction light system from the stored output of the plurality of sensors; and
   a wireless transmitter configured to transmit the diagnostics,
   wherein the wireless transmitter is a wireless fidelity transmitter that generates a wireless fidelity hotspot.

2. The obstruction light system of claim 1, further comprising the ambient light sensor and the ambient light sensor being configured to determine when to change a color output of the light; and
   the processor configured to generate diagnostics for the ambient light sensor based on an ambient light sensor output.

3. The obstruction light system of claim 1, wherein the storage device further stores tower configuration information that comprises at least one of the following: tower type, total number of beacons, total number of marker tiers, flash rate, override time, and flash type; and
   the wireless transmitter is configured to transmit the tower configuration information accessible by a hotspot generated by the wireless transmitter.

4. The obstruction light system of claim 1, wherein the storage device further stores tower configuration information and status information; and
   wherein the tower configuration information, status information, and diagnostics are made available on a webpage accessible by a hotspot generated by the wireless transmitter.

5. The obstruction light system of claim 1, further comprising an encrypted communication channel over which the wireless transmitter transmits the diagnostics of the light.

6. The obstruction light system of claim 1, wherein the storage device further stores alarm information associated with the system; and
the wireless transmitter is configured to transmit the alarm information.

7. The obstruction light system of claim 1, wherein the storage device further stores tower configuration information that comprises at least one of the following: tower type, total number of beacons, total number of marker tiers, flash rate, override time, and flash type;
wherein the storage device further stores alarm information associated with the system; and
the wireless transmitter is configured to transmit the alarm information and configured to transmit the tower configuration.

8. The obstruction light system of claim 1, wherein the processor is further configured to store an acknowledgement of successful transmission received from the wireless transmitter.

9. A method of operating an obstruction light system and obstruction light monitoring system comprising:
sensing, with a plurality of sensors associated with components of an obstruction light, at least the following: an ambient light, a voltage, a current, and a temperature;
receiving output from the plurality of sensors with a processor;
storing the output from the plurality of sensors in a storage device;
generating diagnostics of the components of the obstruction lighting system from the stored output of the plurality of sensors with the processor; and
transmitting the diagnostics from the processor with a wireless transmitter,
wherein the wireless transmitter is a wireless fidelity transmitter that generates a wireless fidelity hotspot.

10. The method of operating an obstruction light system of claim 9, further comprising providing the ambient light sensor and the ambient light sensor being configured to determine when to change a color output of the light; and
generating diagnostics for the ambient light sensor based on an ambient light sensor output.

11. The method of operating an obstruction light system of claim 9, further comprising:
storing in the storage device tower configuration information that comprises at least one of the following: tower type, total number of beacons, total number of marker tiers, flash rate, override time, and flash type; and
transmitting the tower configuration information accessible by a hotspot generated by the wireless transmitter.

12. The method of operating an obstruction light system of claim 9, further comprising:
generating tower configuration information and status information; and
generating a webpage to display the tower configuration information, status information, and diagnostics accessible by a hotspot generated by the wireless transmitter.

13. The method of operating an obstruction light system of claim 9, further comprising generating an encrypted communication channel over which the wireless transmitter transmits the diagnostics.

14. The method of operating an obstruction light system of claim 9, further comprising:
storing alarm information associated with the system; and
transmitting the alarm information with the wireless transmitter.

15. The method of operating an obstruction light system of claim 9 further comprises:
storing in the storage device tower configuration information that comprises at least one of the following: tower type, total number of beacons, total number of marker tiers, flash rate, override time, and flash type;
transmitting the tower configuration information;
storing alarm information associated with the system; and
transmitting the alarm information with the wireless transmitter.

16. The method of operating an obstruction light system of claim 9, wherein the processor is further configured to make a record of an acknowledgement of successful transmission received from the wireless transmitter.

17. The obstruction light system of claim 1, further comprising the ambient light sensor and the ambient light sensor being configured to determine when to change an intensity of the light.

18. The method of operating an obstruction light system of claim 9, further comprising providing the ambient light sensor and the ambient light sensor being configured to determine when to change intensity of light output.

* * * * *